US008746985B2

(12) United States Patent
Murakami et al.

(10) Patent No.: US 8,746,985 B2
(45) Date of Patent: Jun. 10, 2014

(54) ROLLING BEARING DEVICE FOR WHEEL

(75) Inventors: Takanobu Murakami, Toyota (JP);
Takaaki Onizuka, Kashiwara (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 476 days.

(21) Appl. No.: 12/312,120

(22) PCT Filed: Oct. 29, 2007

(86) PCT No.: PCT/JP2007/071016
§ 371 (c)(1),
(2), (4) Date: Apr. 27, 2009

(87) PCT Pub. No.: WO2008/053831
PCT Pub. Date: May 8, 2008

(65) Prior Publication Data
US 2010/0046876 A1    Feb. 25, 2010

(30) Foreign Application Priority Data

Oct. 30, 2006  (JP) ................................. 2006-294471
Nov. 1, 2006   (JP) ................................. 2006-297556

(51) Int. Cl.
*F16C 13/00*    (2006.01)
(52) U.S. Cl.
USPC ........................................................ 384/544
(58) Field of Classification Search
USPC ......... 384/543, 544, 546, 547, 586, 588, 589, 384/584; 301/105.1
See application file for complete search history.

(56) References Cited

U.S. PATENT DOCUMENTS

| 2,272,118 | A | * | 2/1942 | Imse et al. ................... 384/206 |
| 3,724,907 | A | * | 4/1973 | Housel ........................ 301/105.1 |
| 4,408,809 | A | * | 10/1983 | Walter et al. .................. 384/486 |
| 4,749,288 | A | * | 6/1988 | Tilch et al. .................... 384/584 |
| 5,727,886 | A | * | 3/1998 | Hata et al. ..................... 384/537 |
| 6,883,236 | B2 | * | 4/2005 | Toda et al. ................. 29/898.09 |
| 2004/0170345 | A1 | | 9/2004 | Takada |
| 2005/0018939 | A1 | * | 1/2005 | Niwa et al. .................... 384/544 |

(Continued)

FOREIGN PATENT DOCUMENTS

EP    1 431 071 A2    6/2004
EP    1 566 286 A2    8/2005

(Continued)

OTHER PUBLICATIONS

European Search Report dated Mar. 14, 2011.

*Primary Examiner* — James Pilkington
(74) *Attorney, Agent, or Firm* — McGinn IP Law Group, PLLC

(57) ABSTRACT

A rolling bearing device for a wheel includes a fixed bearing ring in a tubular shape which is fixed to a vehicle side, and a rotary bearing ring which is rotatably passed through the fixed bearing ring, and includes a plurality of flange portions for mounting the wheel formed on an outer periphery at one end side thereof in an axial direction, and a spigot joint portion in an annular shape protruding in the axial direction formed in a one end part thereof in the axial direction. A circular recess is formed in the one end part of the rotary bearing ring in the axial direction. Thick wall parts for reinforcement are formed on an inner peripheral surface of the spigot joint portion at positions corresponding to regions between a part between the respective flange portions.

4 Claims, 8 Drawing Sheets

(56) References Cited

U.S. PATENT DOCUMENTS

| | | |
|---|---|---|
| 2005/0185870 A1 | 8/2005 | Kobayashi et al. |
| 2005/0254741 A1* | 11/2005 | Norimatsu .................. 384/544 |
| 2007/0119054 A1 | 5/2007 | Kobayashi et al. |

FOREIGN PATENT DOCUMENTS

| | | |
|---|---|---|
| JP | 2001-47805 | 2/2001 |
| JP | 2003-94905 | 4/2003 |
| JP | 2003-161338 | 6/2003 |
| JP | 2004-306681 | 11/2004 |
| JP | 2005-59830 | 3/2005 |
| JP | 2006-7791 | 1/2006 |
| JP | 2006-264399 | 10/2006 |
| WO | WO 2006/024281 A1 | 3/2006 |

* cited by examiner

ROLLING BEARING DEVICE FOR WHEEL

TECHNICAL FIELD

The present invention relates to a rolling bearing device for a wheel for supporting, for example, a wheel of a vehicle such as an automobile.

BACKGROUND ART

As a rolling bearing device for a wheel which is used for rotatably supporting a wheel of an automobile with respect to a suspension, there has been known a so-called hub unit including a tubular fixed bearing ring which is fixed to a vehicle side, a rotary bearing ring which is rotatably passed through this fixed bearing ring, and a rolling element which is disposed between these bearing rings so as to freely roll. In this hub unit, a plurality of flange portions to be fixed to the suspension are formed radially on an outer peripheral surface of the fixed bearing ring at its one end side in an axial direction, and at the same time, a plurality of flange portions to which a tire wheel and a brake disk of the wheel are to be attached are formed radially on an outer peripheral surface of the rotary bearing ring at the other end side in the axial direction. Moreover, a spigot joint portion in an annular shape projecting in the axial direction is formed at the other end of the rotary bearing ring in the axial direction.

According to request for reducing a weight of a vehicle body, in the above described hub unit too, it is desired to reduce a weight of the hub unit as much as possible, while securing predetermined strength and rigidity, similarly to the other members constituting the vehicle body.

For achieving the weight reduction, it has been conducted to form a circular recess in an end part of the rotary bearing ring at a side where the spigot joint portion is formed. Moreover, as for a shape of the flange portions, it has been conducted to leave only those areas surrounding bolt holes, and to cut away the other areas.

Further, it has been proposed to achieve the weight reduction while securing the strength, by modifying the shape of the aforesaid recess in the end part at the side where the spigot joint portion is formed (Reference should be made to Japanese Patent Publication No. JP-A-2001-47805, for example).

In the hub unit for supporting a wheel disclosed in the Japanese Patent Publication No. JP-A-2001-47805, the recess is formed in a bowl-like shape, and a depth of this recess is set to be 0.3 to 0.8 times as large as a diameter of the recess at its open end. An inner surface of the recess has a sectional shape of a circular arc in at least a part, and its curving direction is not varied in midway over the entire length.

There has been proposed another rolling bearing device for a wheel in which the aforesaid flange is extended radially outwardly in a radial direction from the rotary bearing ring, and formed with a plurality of arm portions formed with through holes to which hub bolts for securing the brake and the wheel of the vehicle are to be fixed (Reference should be made to Japanese Patent Publication No. JP-A-2003-94905, for example)

In the rolling bearing device for a wheel of this type, the brake rotor is fixed to the flange, in a state where the brake rotor is abutted against outer side surfaces of a plurality of the arm portions which are directed to an outward side of the vehicle, and clamped by the hub bolts and hub nuts to be screwed with these hub bolts.

DISCLOSURE OF THE INVENTION

Problems that the Invention is to Solve

However, in case where only those areas surrounding the bolt holes in the flange portions of the rotary bearing ring are left, rigidity of the relevant flange portions is decreased, and hence, strength of the rotary bearing ring may be badly affected, in some cases.

Moreover, in the hub unit disclosed in the Japanese Patent Publication No. JP-A-2001-47805, although the weight reduction has been achieved to a certain extent, this extent is insufficient, and further weight reduction has been desired.

In the conventional rolling bearing device for a wheel as described above, because the flange is formed with a plurality of the arm portions, the weight reduction can be achieved, as compared with the rolling bearing device in which the flange is continuously formed over an entire circumference. However, there is such anxiety that this rolling bearing device may become lack of rigidity.

For this reason, it has been conducted to enhance the rigidity of the arm portions by increasing wall thickness of the whole arm portions. However, in case where the wall thickness of the whole arm portions has been increased, a design and a size of an entire knuckle including the relevant rolling bearing device for a wheel must be changed in some cases, since positions in the axial direction of the outer side surfaces of the arm portions against which a mounting part of the brake is to be butted may vary and soon. Therefore, it is undesirable to remarkably change the shape of the whole arm portions. For this reason, it has been keenly desired to enhance the rigidity of the flange, without changing a size of the flange portionicularly, without changing axial positions of the outer side surfaces of the arm portions forming the flange.

The invention has been made in view of such circumstances, and it is an object of the invention to provide a rolling bearing device for a wheel which can realize further weight reduction, while securing required strength and rigidity.

It is a further object of the invention to provide a rolling bearing device for a wheel in which rigidity of a flange can be enhanced, without remarkably changing a size of the relevant flange.

Means for Solving the Problems

According to the invention, there is provided a rolling bearing device for a wheel comprising a fixed bearing ring in a tubular shape which is fixed to a vehicle side, a rotary bearing ring which is rotatably passed through the fixed bearing ring, having a plurality of wheel mounting flange portions formed radially on an outer periphery of the rotary bearing ring at one end side in an axial direction, and a spigot joint portion in an annular shape protruding in the axial direction formed in the one end part in the axial direction of the rotary bearing ring, characterized in that a circular recess is formed in the one end part in the axial direction of the rotary bearing ring, and thick wall parts for reinforcement are formed on an inner peripheral surface of the spigot joint portion at positions corresponding to a part between the respective flange portions.

In the rolling bearing device for a wheel according to the invention, a plurality of the wheel mounting flange portions are formed radially on the outer periphery of the rotary bearing ring at the one end side in the axial direction, and the circular recess is formed in the one end part in the axial direction of the rotary bearing ring. Specifically, only those areas surrounding the bolt holes in the flange portions of the rotary bearing ring are left, and at the same time, the circular recess formed in the one end part in the axial direction of the rotary bearing ring is formed in a bell-like shape or a cup-like shape instead of the conventional dish-like or bowl-like shape, by deeply hollowing in the axial direction. In this manner, the weight reduction can be realized.

On the other hand, concerning deterioration of the rigidity of the flange portions by leaving only those areas surrounding the bolt holes, the thick wall parts for reinforcement are formed on the inner peripheral surface of the spigot joint portion at the positions corresponding to a part between the respective flange portions, and the areas having the smaller flange rigidity (the areas corresponding to a part between the respective flange portions) are made to have such a sectional shape that they have higher rigidity as compared with the areas having the larger flange rigidity. In this manner, it is possible to prevent deterioration of the strength of the spigot joint portion due to decrease of the rigidity of the flange portions.

In this manner, it is possible to reduce the weight of the rotary bearing ring, and accordingly, the bearing device, while securing the required rigidity and strength.

Further, there is provided according to the invention, a rolling bearing device for a wheel comprising a rotary ring having a flange to which a brake rotor and a wheel of a vehicle are mounted, a fixed ring fixed to the vehicle side and arranged concentrically with the rotary ring, and a plurality of rolling elements which are disposed between the rotary ring and the fixed ring so as to freely roll, wherein the flange is formed with a plurality of arm portions which are extended radially outward in a radial direction from the rotary bearing, and formed with through holes to which hub bolts for fitting the brake rotor and the wheel of the vehicle are fixed, the brake rotor being secured by being butted against outer side surfaces of the arm portions directed to an outward side of the vehicle, characterized in that inner side surfaces of the arm portions directed to an inward side of the vehicle are provided with thick wall parts which are formed thick by protruding inward into the vehicle than bolt seat surfaces of the arm portions with which head parts of the hub bolts are contacted, and extended from the rotary ring outwardly in the radial direction along both side edges of the arm portions so as to at least partially surround the head parts of the hub bolts.

According to the rolling bearing device for a wheel having the above described structure, the rigidity of the arm portions can be enhanced, because the thick wall parts are formed along both the side edges of the arm portions, and these thick wall parts function as ribs for reinforcing the arm portions. Moreover, the thick wall parts are formed thick on the inner side surfaces of the arm portions by protruding inward into the vehicle than the bolt seat surfaces, and hence, the axial positions of the outer side surfaces of the arm portions need not be changed.

In the above described rolling bearing device for a wheel, it is preferable that the tip end edges of the thick wall parts outward in a radial direction are positioned outward in the radial direction than a center position of the through hole.

In this case, the thick wall parts are formed in both the side edge parts of the area having the relatively smaller rigidity where the through hole is positioned, and hence, the rigidity of the arm portion can be more effectively enhanced.

Advantage of the Invention

According to the rolling bearing device for a wheel in this invention, because the arm portions are reinforced by the thick wall parts protruding inward into the vehicle, it is possible to enhance the rigidity of the arm portions without remarkably changing the size of the flange which is formed with the arm portions.

According to the rolling bearing device for a wheel in this invention, further weight reduction can be realized, while securing the required strength and rigidity.

DESCRIPTION OF THE REFERENCE NUMERALS AND SIGNS

Figure 1:
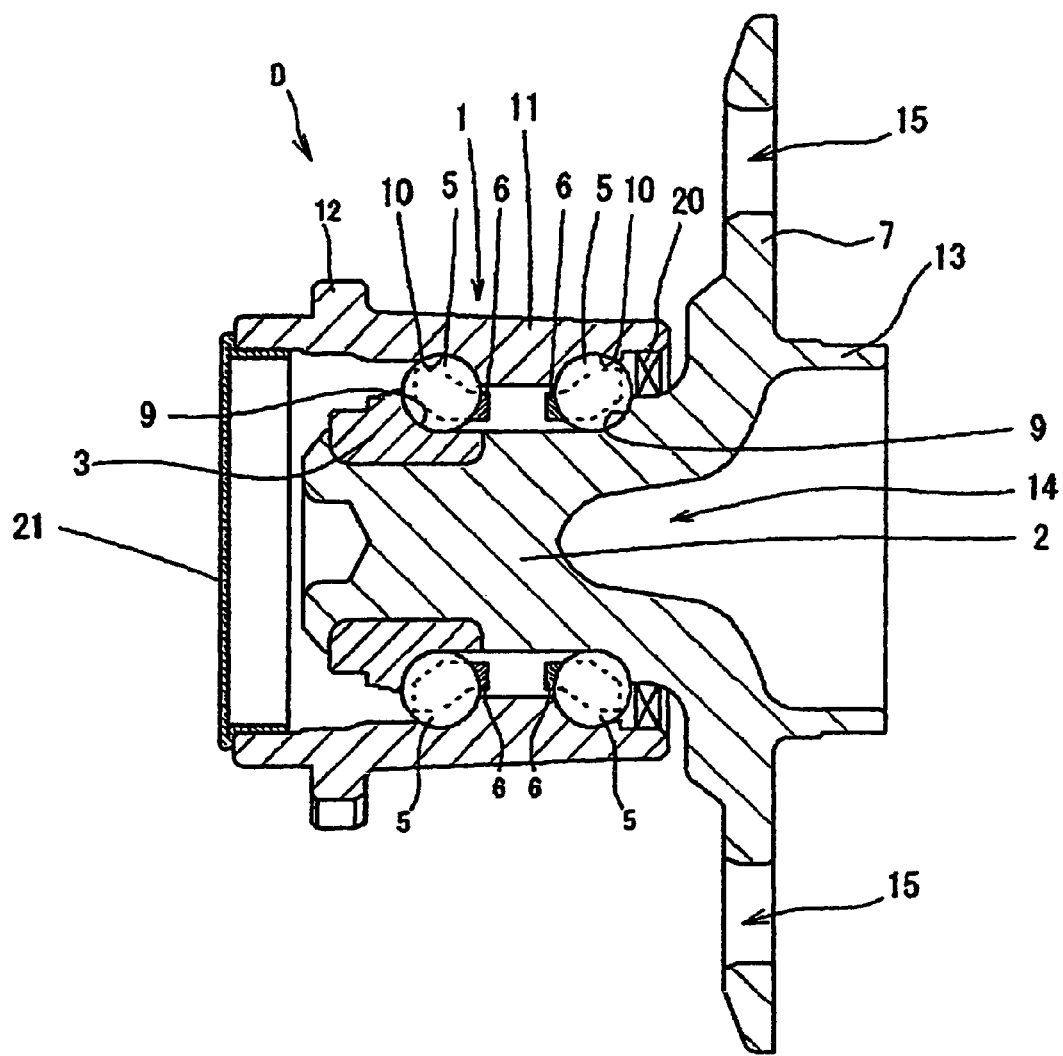
FIG. 1 is an explanatory sectional view of a bearing device in an embodiment according to the invention, taken along an axial direction.

1 Outer ring
2 Inner shaft
3 Inner ring member
7 Flange portion
13 Spigot joint portion
14 Recess
15 Bolt hole
16 Thick wall part
D Bearing device
110 Rolling bearing device for wheel
111 Outer ring (fixed ring)
112 Inner shaft (rotary ring)
113 Ball (rolling element)
120 Flange
121 Arm portion
121*a* Outer side surface
121*b* Inner side surface
122 Through hole
123 Bolt seat surface
124 Thick wall part
124*b*1 Tip end edge
B Brake drum (brake rotor)
H Hub bolt
H1 Head part
W Wheel

BEST MODE FOR CARRYING OUT THE INVENTION

Now, referring to the attached drawings, a rolling bearing device for a wheel (hereinafter also referred to simply as "a bearing device") in a first embodiment according to the invention will be described in detail.

FIG. 1 is an explanatory sectional view of the bearing device in the first embodiment according to the invention taken along an axial direction. It is to be noted that the right side in FIG. 1 is an outer side of a vehicle (an outside of the vehicle) and the left side is an inner side of the vehicle (an inside of the vehicle).

As shown in FIG. 1, a bearing device D in the first embodiment includes an outer ring 1 in a tubular shape, an inner shaft 2 which is rotatably passed through the outer ring 1, an inner ring member 3 which is fitted from outside to an end of this inner shaft 2 at the inner side of the vehicle, and rolling elements 5, 5 in double rows formed with a plurality of balls which are arranged in a circumferential direction, whereby a double row angular ball bearing part is formed. The balls in the respective rows as the rolling elements 5, 5 are held by cages 6 at a predetermined interval in a circumferential direction.

In the bearing device D in the first embodiment, the outer ring 1 is a fixed bearing ring which is fixed to a vehicle body side. On the other hand, a rotary bearing ring at a wheel side is formed with the inner shaft 2 and the inner ring member 3. The aforesaid double row rolling elements 5, 5 are interposed between the fixed bearing ring and the rotary bearing ring so as to freely roll. In this manner, the fixed bearing ring and the rotary bearing ring are arranged coaxially with each other, and the rotary bearing ring is so adapted as to rotate with respect to the fixed bearing ring, together with a wheel (not shown).

Figure 2:
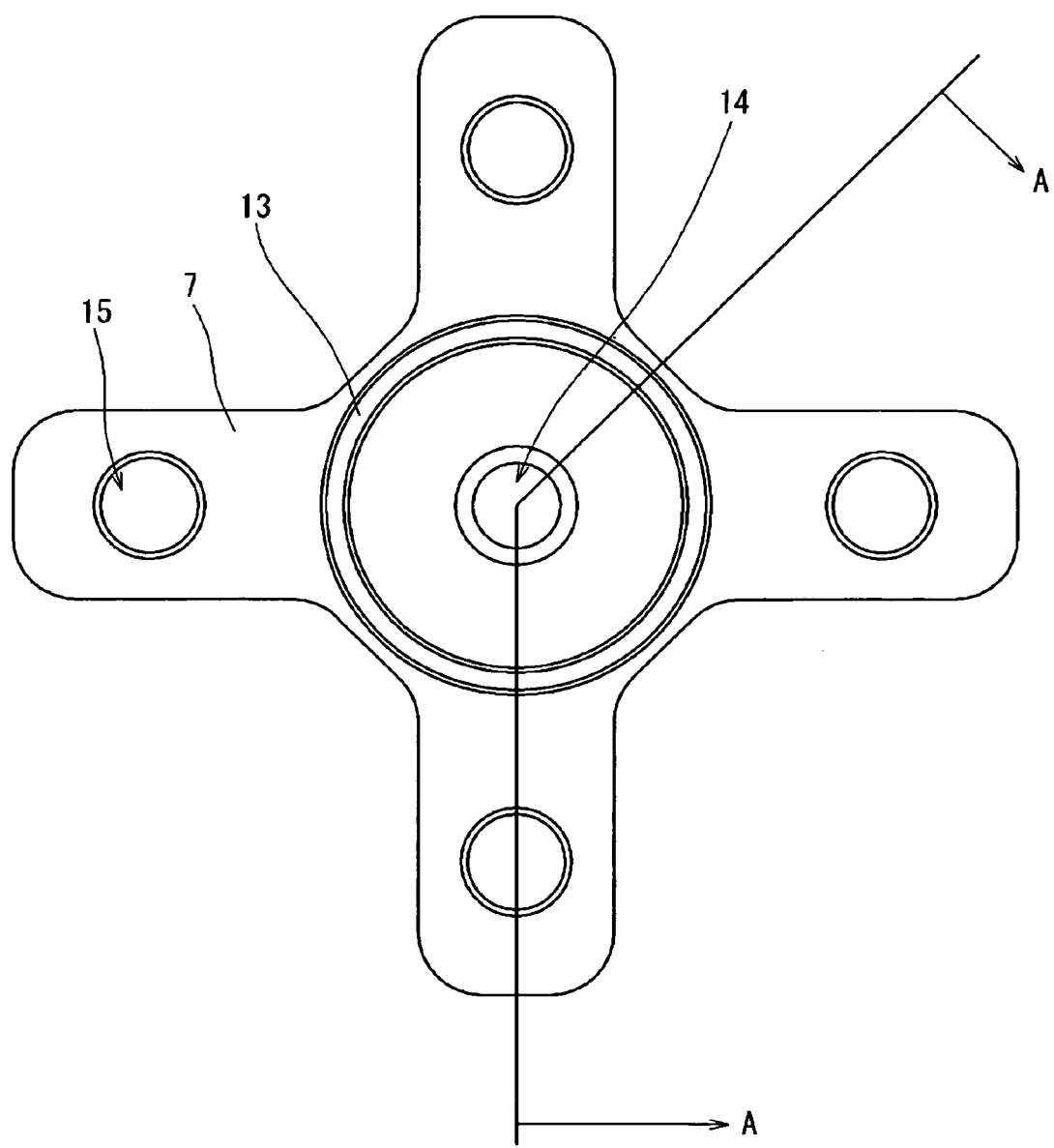
FIG. 2 is a front view of a rotary bearing ring in the bearing device as shown in FIG. 1, as seen from a flange portion side.

The inner shaft 2 forming the rotary bearing ring has a plurality of flange portions 7 extending radially outwardly in a radial direction at the outer side of the vehicle. These flange portions 7 serve as a mounting part to which a tire wheel and a brake disk of the wheel are fitted. The flange portions 7 are so shaped that only those areas surrounding bolt holes 15 are left, while the other areas are cut away, as shown in FIG. 2, and in this manner, the inner shaft 2 is made lightweight. The tire wheel or the like is mounted to the relevant flange portions 7 with fitting bolts which are not shown. The inner ring member 3 is fitted over a stepped part which is formed on the inner shaft 2 at the inner side of the vehicle, and fixed to the inner shaft 2 by caulking the end part of the inner shaft 2 at the inner side of the vehicle. Inner raceway surfaces 9, 9 for the rolling elements 5, 5 are respectively formed on an outer peripheral surface of the inner shaft 2 and on an outer peripheral surface of the inner ring member 3.

Moreover, a spigot joint portion 13 in an annular shape protruding in the axial direction is formed in an end part of the inner shaft 2 at the outer side of the vehicle, and a recess 14 in a circular shape is formed in the end part where the spigot joint portion 13 is formed.

The outer ring 1 forming the fixed bearing ring includes a tubular body part 11 in a cylindrical shape having outer raceway surfaces 10, 10 for the rolling elements 5, 5 formed on an inner peripheral surface thereof, and a flange portion 12 extending outward in a radial direction from an outer peripheral surface of this tubular body part 11. This flange portion 12 is fixed to a knuckle (not shown) of a suspension which is a member at the vehicle body side, whereby the bearing device D can be fixed to the vehicle body side.

A sealing unit 20 is provided between an inner peripheral surface of the end part of the outer ring 1 at the outer side of the vehicle and the outer peripheral surface of the inner shaft 2 opposed thereto. Moreover, a cover 21 is press-fitted to an inner peripheral surface of the end part of the outer ring 1 at the inner side of the vehicle.

The invention is characterized in that the recess 14 in a circular shape formed in the end part of the inner shaft 2 at the outer side of the vehicle has a bell-like shape or a cup-like shape in cross section in the axial direction which is deeply hollowed in the axial direction of the bearing device D. By thus deeply forming the recess 14 in the axial direction, the weight of the inner shaft 2 can be reduced, as compared with a dish-like sectional shape or a bowl-like sectional shape of the recess in the conventional bearing device. It would be preferable that a depth of the recess 14 is up to the end of the inner ring member 3 at the outer side of the vehicle, and a width of the recess 14 is set to be smaller than an inner diameter of the inner ring member 3. It is also possible to form the recess 14 as a through hole into which a driving shaft is inserted.

Figure 3:
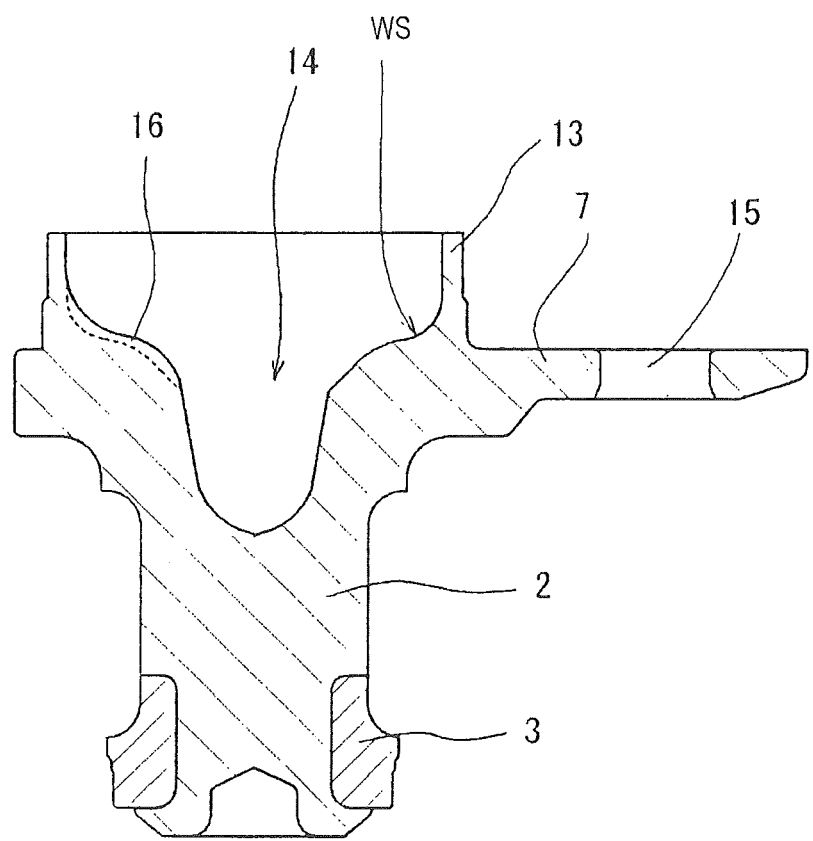
FIG. 3 is a sectional view taken along a line A-A in FIG. 2.

Moreover, in the conventional bearing device, a sectional shape of an inner diameter part of the spigot joint portion is axially symmetrical with respect to the full 360 degree, and therefore, strength of the inner shaft may be badly affected in some cases, in case where the flange portions of the inner shaft are so shaped that only those areas surrounding the bolt holes are left, as described above. However, according to the invention, the sectional shape of the inner diameter part of the spigot joint portion is made different in a circumferential direction. Specifically, as shown in FIG. 3, thick wall parts 16 for reinforcement are formed at positions corresponding to a part between the respective flange portions 7 on an inner peripheral surface of the spigot joint portion 13, thus giving high rigidity to the areas having smaller flange rigidity (corresponding to a part between the respective flange portions 7), as compared with the areas having larger flange rigidity. In this manner, it is possible to prevent the rigidity of the spigot joint portion 13 from being deteriorated due to decrease of the rigidity of the flange portions 7.

As described above, in this invention, the weight of the inner shaft 2 and accordingly, the weight of the bearing device D are reduced to the minimum, by making the flange portions 7 of the inner shaft 2 so shaped that the other areas except the areas surrounding the bolt holes are cut away, and by making the sectional shape of the recess 14 formed in the one end part of the inner shaft 2 into such a shape as deeply hollowed in the axial direction. On the other hand, concerning such anxiety that the rigidity of the inner shaft 2 may be deteriorated due to the above described shape of the flange portions 7 of the inner shaft 2, the deterioration of the rigidity is prevented, by forming the thick wall parts 16 for reinforcement at the positions corresponding to a part between the flange portions 7 on the inner peripheral surface of the spigot joint portion 13.

Figure 4:
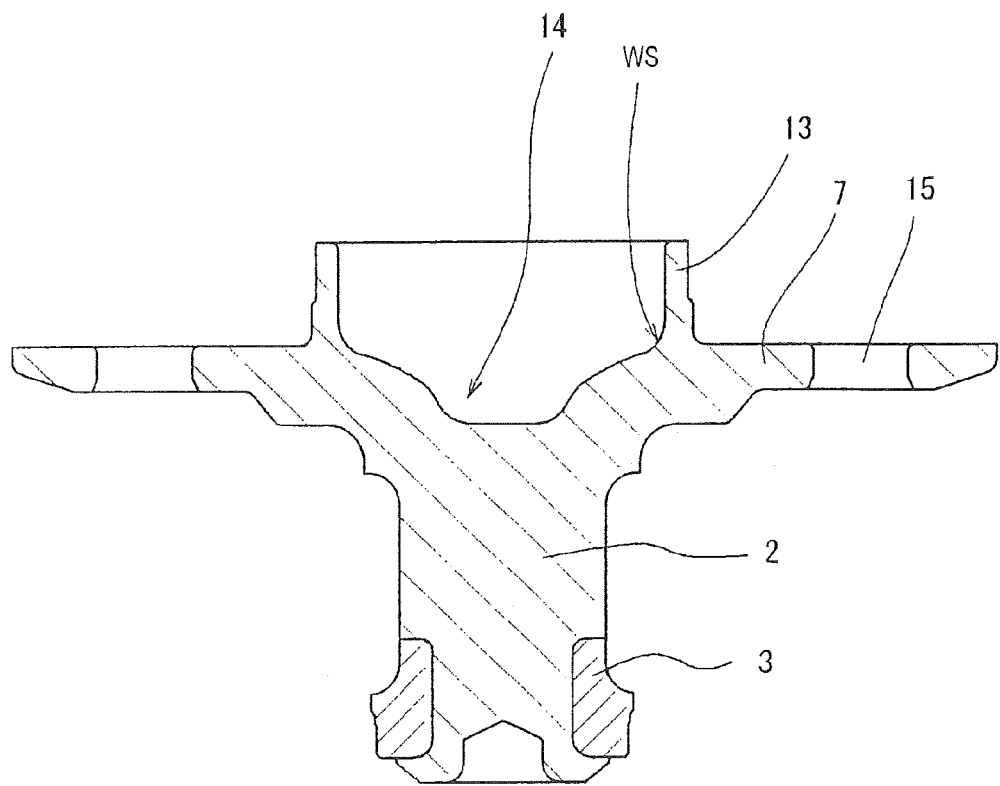
FIG. 4 is a sectional view of a rotary bearing ring according to a comparative example, taken along the axial direction.

FIG. 4 is a sectional view in the axial direction of the rotary bearing ring in a comparative example of the invention. Comparison of performance by FEM analysis has been conducted between the rotary bearing ring as shown in FIG. 4 and the rotary bearing ring as shown in FIGS. 1 to 3 (the embodiment). In this comparative example, different from the rotary bearing ring as shown in FIGS. 1 to 3, the recess in the circular shape formed in the end part of the rotary bearing ring at the inner side of the vehicle has a shallow dish-like shape in section in the axial direction as in the conventional bearing device. Moreover, a sectional shape of the inner diameter part of the spigot joint portion is axially symmetrical with respect to the full 360 degree, and the thick wall parts for reinforcement in the invention are not formed. Other specifications (shape and size) are the same both in the embodiment and in the comparative example.

Figure 5:
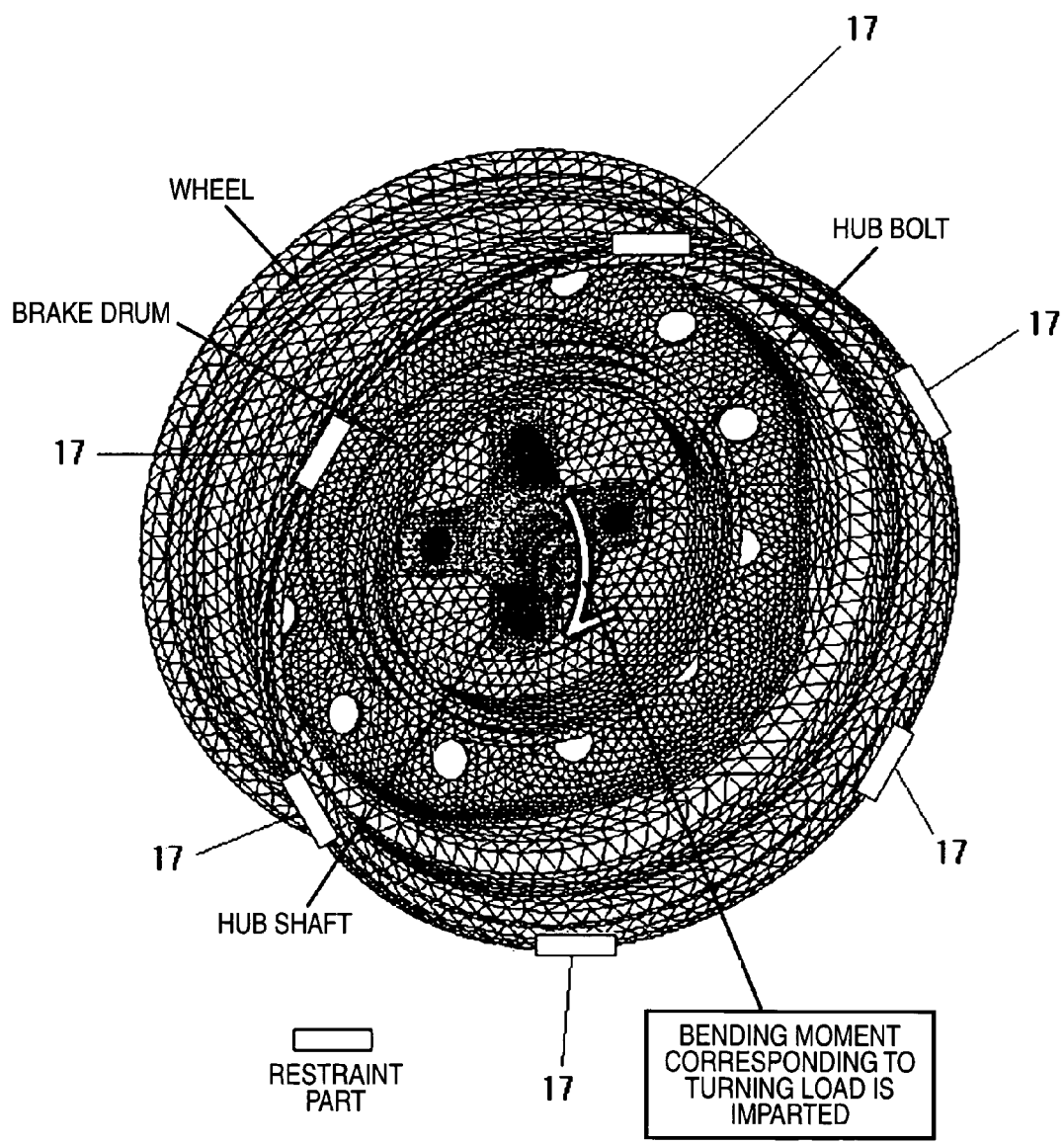
FIG. 5 is a view for explaining boundary condition for analyzing shaft strength of the rotary bearing rings in the embodiment and in the comparative example.

FIG. 5 shows boundary condition for analyzing the shaft strength of the rotary bearing rings in the embodiment and in the comparative example. Provided that the brake drum and the wheel are fixed to the flange portions of the rotary bearing ring by means of the hub bolts (fitting bolts), a bending moment corresponding to a turning load is imparted to the rotary bearing ring. In FIG. 5, a position denoted with numeral 17 is a restraint part.

Figure 6:
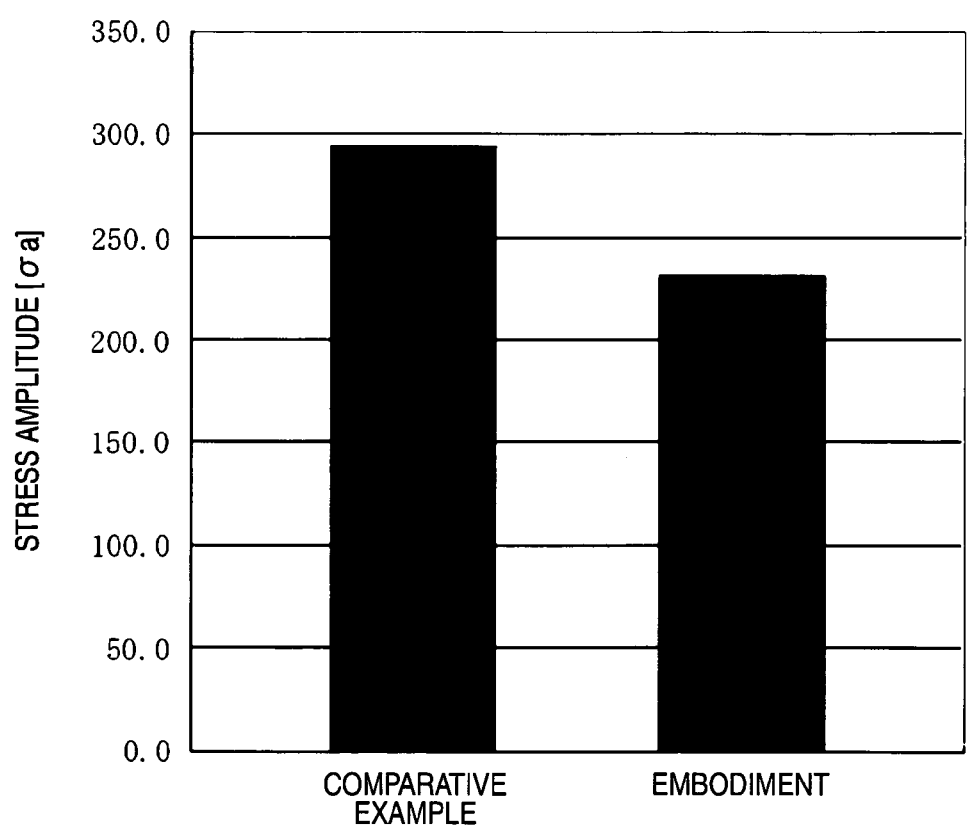
FIG. 6 is a chart showing stress amplitudes of inner diameter parts of spigot joint portions of the rotary bearing rings in the embodiment and in the comparative example.

Stress amplitudes at the positions having the presumed weakest strength (a position WS in FIGS. 3 and 4) in the inner diameter part of the spigot joint portion are compared between the embodiment and the comparative example, and the results are shown in FIG. 6. It is found from FIG. 6 that the strength is by 30% larger in the embodiment than in the comparative example. The rotary bearing ring in the embodiment has a volume of 118647 mm.sup.3, and the rotary bearing ring in the comparative example has a volume 115068 mm.sup.3, which are substantially the same. From the above, it is found that the embodiment has the shape superior in strength as compared with the comparative example, although it has substantially the same volume, that is, the same weight as the conventional shape (the comparative example). In other words, in the rotary bearing ring in the comparative example, for the purpose of obtaining the strength equal to the embodiment, it is necessary to increase the rigidity of the flange portions by making the flange portions larger or thicker. However, in this case, the weight becomes considerably larger than in the embodiment, and the weight reduction would be insufficient. In this invention, the increase in weight by forming the thick wall parts for reinforcement is offset by forming the recess deeply in the axial direction, and it is possible to reduce the weight of the rotary bearing ring, while securing the required strength and rigidity.

Figure 7:
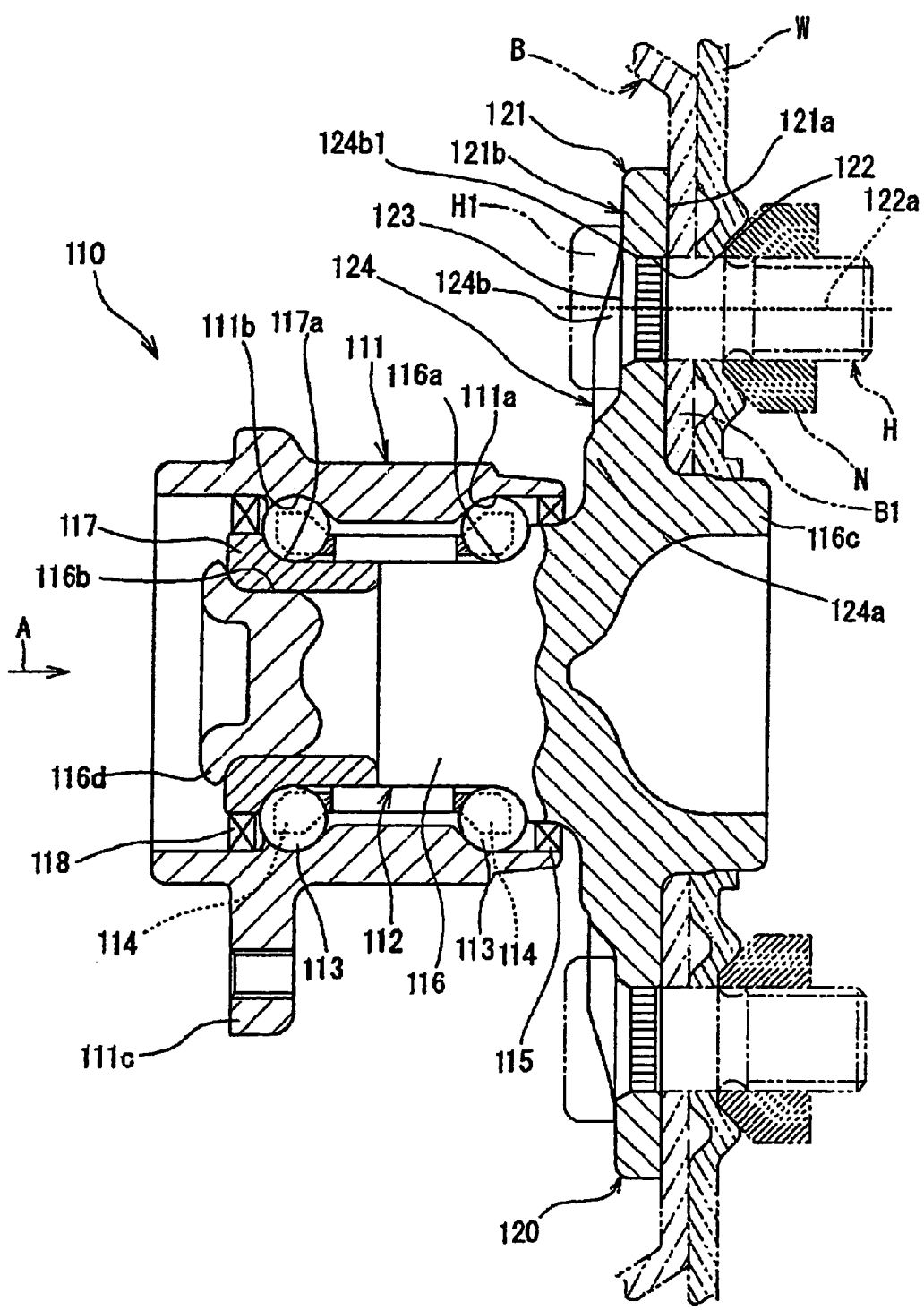
FIG. 7 is a sectional view showing a structure of a rolling bearing device for a wheel in a first embodiment according to the invention.

Then, a second preferred embodiment according to the invention will be described referring to the attached drawings. FIG. 7 is a sectional view showing a structure of a rolling bearing device for a vehicle in the second embodiment according to the invention. A rolling bearing device 110 for a wheel is employed for rotatably supporting a wheel of a vehicle such as an automobile with respect to a suspension.

The rolling bearing device 110 for a wheel includes an outer ring 111, an inner shaft (hub) 112, a plurality of balls 113 as rolling elements which are disposed between the outer ring 111 and the inner shaft 112, cages 114 which hold these balls 113 at equal intervals in a circumferential direction, and seal members 115, 118 for sealing an annular clearance between the outer ring 111 and the inner shaft 112.

The outer ring 111 is a fixed ring which is fixed to the vehicle side, and has first and second outer ring raceways 111a, 111b formed on an inner peripheral surface thereof, and a fitting part 111c formed on an outer peripheral surface thereof for being fitted to the suspension of the vehicle, which is not shown.

The inner shaft 112 which is concentrically arranged at an inner peripheral side of the outer ring 111 constitutes a rotary ring, and at the same time, an axle to which the wheel of the vehicle is to be mounted. The inner shaft 112 is formed by combining an inner shaft body 116 and an inner ring 117.

The inner shaft body 116 is provided, at its one end side, with a flange 120 to which a wheel W constituting the wheel and a brake drum B as a brake rotor are fitted, and a spigot joint portion 116c which is fitted to inner diameter surfaces of these wheel W and the brake drum B. Moreover, at the other end side of the inner shaft body 116, there is formed a small diameter part 116b which is smaller in diameter than an inner ring raceway 112a. Further, a first inner ring raceway 116a opposed to the first outer ring raceway 111a is formed on the outer peripheral surface of the inner shaft body 116. A recess in a circular shape is formed in the end part where the spigot joint portion 116c is formed. This recess may be formed as a through hole into which a driving shaft is inserted.

The inner ring 117 is formed in an annular shape, and inserted into the small diameter part 116b of the inner shaft body 116 in a press-fitted manner. At the same time, the inner ring 117 is restricted from moving in an axial direction by a caulking part 116d which is formed in the other end part of the inner shaft body 116, whereby the inner ring 117 is fixed to the inner shaft body 116 so as to be integrally rotated therewith. Moreover, a second inner ring raceway 117a opposed to the second outer ring raceway 111b is formed on an outer peripheral surface of this inner ring 117.

A plurality of the balls 113 are disposed between the aforesaid first and second outer ring raceways 111a, 111b, and the first and second inner ring raceways 116a, 117a at a predetermined contact angle with respect to the respective raceways so as to freely roll. In this manner, this rolling bearing device 110 for a wheel constitutes a double row angular ball bearing. Therefore, the inner shaft 112 is held so as to rotate with respect to the outer ring 111.

The relevant rolling bearing device 110 for a wheel is fixed to the vehicle so that the one end side of the inner shaft body 116 (the right side in the drawing) where the flange 120 to which the wheel W is fitted is formed may be an outward side of the vehicle, and the other end side (the left side in the drawing) may be an inward side of the vehicle.

Figure 8:
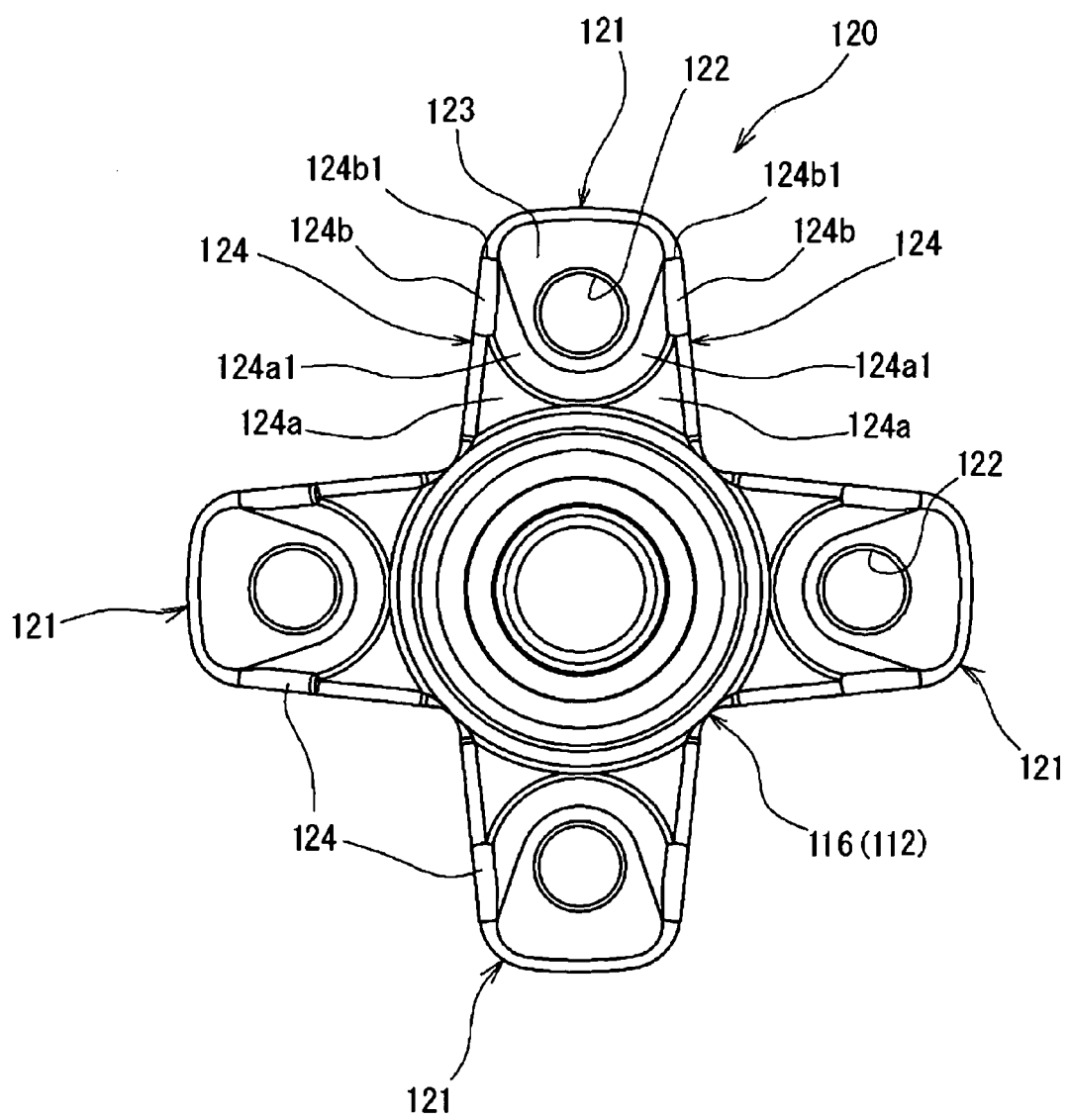
FIG. 8 is an outlook view showing a shape of a flange as seen from a direction of an arrow mark A in FIG. 7.

FIG. 8 is an outlook view showing a shape of the flange 120 as seen from a direction of an arrow mark A in FIG. 7. Referring to FIGS. 7 and 8, the flange 120 is formed with four arm portions 121 which are extended radially outwardly in a radial direction from the inner shaft 112 (the inner shaft body 116) as the rotary ring. These arm portions 121 are arranged at equal intervals in a circumferential direction, and through holes 122 to which hub bolts H for securing the brake drum B and the wheel W are fixed are formed in respective center parts of the arm portions 121.

Spline grooves are respectively formed on respective inner peripheral surfaces of the through holes 122 and on outer peripheral surfaces of the hub bolts H so that they mesh with each other, whereby the hub bolts H are spline-engaged with the through holes 122 to be fixed to the arm portions 121.

The brake drum B is disposed on outer side surfaces 121a of the arm portions 121 which are directed to the outward side of the vehicle, in a state where its fitting part B1 is butted against the outer side surfaces 121a. The wheel W is further superposed at the outward side of this brake drum B. These brake drum B and the wheel W are clamped between the outer side surfaces 121a and hub nuts N which are screwed with the hub bolts H, thereby to be fixed to the arm portions 121, and fitted to the flange 120.

A bolt seat surface 123 which is substantially parallel to a plane perpendicular to the axial direction and with which the head part H1a of the hub bolt H is brought into contact is formed on an inner side surface 121b of each of the arm portions 121 which is directed to the inward side of the vehicle. Further, the inner side surface 121b is provided with thick wall parts 124 which are formed thick by protruding inward into the vehicle than the bolt seat surface 123 and extended from the inner shaft body 116 radially outwardly along both side edges of the arm portion 121 so as to at least partially surround the head part H1a of the hub bolt H.

Base end areas 124a of the thick wall parts 124 close to the inner shaft body 116 are so formed as to be thick over entire regions enclosed by both the side edges of the arm portion 121, the outer peripheral surface of the inner shaft body 116, and boarder parts 124a1 of the base end areas 124a with respect to the bolt seat surface 123, when the thick wall parts 124 are seen from the front. Moreover, the boarder parts 124a1 of the base end areas 124a with respect to the bolt seat surface 123 are so formed as to at least partially surround the head part H1 of the hub bolt H. In this manner, the base end areas 124a of the thick wall parts 124 are so formed that the base end part of the arm portion 121 may be made thick, avoiding the head part H1, and thus, strength of the base end part of the arm portion 121 can be enhanced.

Tip end portions 124b of the thick wall parts 124 outward. in the radial direction are extended outward in the radial direction from the base end areas 124a, and formed in a rib-like shape at both side edges of the arm portion 121 so as to surround the head part H1 of the hub bolt H from both sides. The tip end portions 124b are inclined so as to become gradually thinner toward tip end edges 124b1 outward in the radial direction and continued to the bolt seat surface 123. Because the tip end edges 124b1 of the tip end portions 124b are smoothly continued as described, concentration of stress to the boarder parts between the tip end portions 124b of the thick wall parts 124 and the bolt seat surface 123 is prevented. Moreover, the tip end edges 124b1 of the tip end portions 124b are so formed as to be positioned outward in the radial direction than a center axis 122a of the through hole 122.

In the rolling bearing device 110 for a wheel having the above described structure, the brake drum B and the wheel W are fitted to the flange 120 formed with the arm portions 121, and the outer ring 111 is fixed to the suspension at the vehicle side, whereby the wheel including the wheel W is supported so as to rotate with respect to the vehicle.

According to the rolling bearing device 110 for a wheel having the above described structure in the second embodiment, the thick wall parts 124 are formed along both the side edges of the arm portion 121, and these thick wall parts 124 function as ribs for reinforcing the arm portion 121, enabling the rigidity of the arm portion 121 to be enhanced. Moreover, because these thick wall parts 124 are formed on the inner side surface 121b by protruding inward into the vehicle to be thicker than the bolt seat surface 123 of the arm portion 121, axial position of the outer side surface 121a of the arm portion 121 need not be changed, and a size of the flange 120 need not be remarkably changed.

As described above, in the rolling bearing device 110 for a wheel in the second embodiment, the rigidity of the flange 120 can be enhanced without remarkably changing the size of the flange 120, by forming the thick wall parts 124 in the arm portion 121. Therefore, it is possible to complement the rigidity of the fitting part B1 and to prevent breakdown of the brake drum B in an early period, without changing design of an entire knuckle including the relevant rolling bearing device 110 for a wheel, even though rigidity of the fitting part B1 of the brake drum B has been set low for the purpose of moderating distortion of the brake drum B.

Moreover, in the second embodiment, because the tip end edges 124b1 of the thick wall parts 124 are positioned outward in the radial direction than the center axis 122a of the through hole 122, the thick wall parts 124 are formed in both the side edge areas of the through hole 122 in the arm portion 121 where the rigidity is relatively low. As the results, the rigidity of the arm portion 121 can be more effectively enhanced.

It is to be noted that the rolling bearing device for a wheel according to the invention is not limited to the second embodiment. For example, although the rolling bearing device constituting the double row angular ball bearing has been described in the second embodiment, it is also possible to apply this invention to the rolling bearing device constituting a double row taper roller bearing, a single row ball bearing, and so on. Further, although a case where the outer ring 111 is the fixed ring and the inner ring 112 is the rotary ring has been described in the second embodiment, it is also possible to apply the invention to a rolling bearing device in which the outer ring is the rotary ring and the inner ring is the fixed ring.

Moreover, although a case where the brake drum of the drum brake is fitted as the brake rotor has been described in the second embodiment, it is also possible to apply the invention to a case where a disk rotor of a disk brake is fitted.

The invention claimed is:
1. A rolling bearing device for a wheel, said rolling bearing device comprising:
  a rotary ring comprising a flange including a plurality of arm portions formed with through holes to which hub bolts for fitting a brake rotor and a wheel of a vehicle are fixed, and extended radially outward in a radial direction, the brake rotor being secured by being butted against outer side surfaces of the arm portions directed to an outward side of the vehicle;
  a fixed ring which is fixed to a vehicle side and arranged concentrically with the rotary ring; and
  a plurality of rolling elements which are disposed between the rotary ring and the fixed ring so as to freely roll,
  wherein inner side surfaces of the arm portions directed to an inward side of the vehicle are provided with thick wall parts which are formed thick by protruding further inward into the vehicle than bolt seat surfaces of the arm portions with which head parts of the hub bolts are contacted, said thick wall parts extending from the rotary ring radially outwardly along side edges of the arm portions so as to surround radially inner portions of the head parts of the hub bolts,
  wherein each of the thick wall parts comprises:
    a base portion having a constant thickness and which extends radially outward along the side edges of the arm portions to circumferentially surround the radially inner portion of the head part of the hub bolt; and
    a tip end portion which is connected to the base portion and one of the bolt seat surfaces and which has a thickness gradually decreasing from the base portion toward said one of the bolt seat surfaces, and
  wherein a boundary between the base portion and the tip end portion and a boundary between the tip end portion and said one of the bolt seat surfaces extend circumferentially around the radially inner portion of the head part of the hub bolt in a plan view.
2. A rolling bearing device for a wheel according to claim 1, wherein the tip end portions of the thick wall parts extend outward in the radial direction and are positioned further outward in the radial direction than a center position of each of the through holes.
3. A rolling bearing device for a wheel according to claim 1, wherein the tip end portions of the thick wall parts are inclined such that a thickness of the tip end portion continuously decreases toward an edge of the bolt seat surfaces.
4. A rolling bearing device for a wheel according to claim 1, wherein a thickness of the tip end portions of the thick wall parts continuously decrease from a position at a central axis of one of the through holes toward an edges of the bolt seat surfaces.

* * * * *